United States Patent [19]

Kakuma et al.

[11] Patent Number: 5,555,243
[45] Date of Patent: Sep. 10, 1996

[54] SELF ROUTING EXCHANGE AND EXCHANGE SYSTEM

[75] Inventors: Satoshi Kakuma; Shiro Uriu; Noriko Samejima; Masami Murayama, all of Kawasaki; Noaki Fukuda, Fukuoka, all of Japan

[73] Assignee: Fujitsu Limited, Kanagawa, Japan

[21] Appl. No.: 353,499

[22] Filed: Dec. 9, 1994

[30] Foreign Application Priority Data

Jun. 2, 1994 [JP] Japan ................................. 6-121386

[51] Int. Cl.$^6$ ........................................... H04L 12/64
[52] U.S. Cl. ..................... 370/58.2; 370/60.1; 370/65.5; 370/79; 370/94.2; 340/826
[58] Field of Search ................................. 370/58.1, 58.2, 370/60, 60.1, 63, 65.5, 79, 94.1, 94.2; 340/825.8, 826

[56] References Cited

U.S. PATENT DOCUMENTS

| | | | |
|---|---|---|---|
| 4,494,230 | 1/1985 | Turner | 370/60 |
| 4,993,018 | 2/1991 | Hajikano et al. | 370/60 |
| 5,204,857 | 4/1993 | Obara | 370/60 |
| 5,285,444 | 2/1994 | Sakurai et al. | 370/60 |
| 5,361,255 | 11/1994 | Diaz et al. | 370/58.1 |
| 5,390,178 | 2/1995 | Hunter | 370/63 |

FOREIGN PATENT DOCUMENTS 3-230644  10/1991  Japan .............................. H04L 12/56

Primary Examiner—Douglas W. Olms
Assistant Examiner—Russell W. Blum

[57] ABSTRACT

A self-routing exchange which includes switch modules connected in multiple stages. A synchronous transfer mode (STM) circuit switch module, which is capable of changing over a connection relationship between incoming highways and outgoing highways, is provided between the multistage-connected switch modules and self-routing switch modules. Asynchronous transfer mode (ATM) switch modules are provided as switch modules in preceding and succeeding stages of the circuit switching module. In dependence upon the number m of self-routing switch modules, a controller sets, by means of software, the connection relationship between the incoming and outgoing highways in each of space switches incorporated within the circuit switching module. As a result, the total mn-number of incoming highways from the self-routing switch modules are connected to respective ones of mn-number of outgoing highways set by the controller. In a case where self-routing switch modules are added on later to expand the system, the controller changes the connection relationship between the incoming and outgoing highways in each space switch within the circuit switching module, using software.

7 Claims, 15 Drawing Sheets

SELF ROUTING EXCHANGE AND EXCHANGE SYSTEM

BACKGROUND OF THE INVENTION

This invention relates to a self-routing exchange and, more particularly, to a self-routing exchange in which the amount of hardware can be reduced and which can be enlarged in scale (extended) with ease.

There is increasing demand not only for audio communication and data communication but also for multimedia communication in which moving pictures are transmitted as well as audio and data, and a B-ISDN (broadband-ISDN) switching technique, which is based upon an asynchronous transfer mode (ATM), is now being put to practical use as means for realizing such broadband communication.

ATM transmission converts all information into fixed information, which is referred to as a "cell", cell transfers the information at high speed. More specifically, in ATM transmission, a line is allocated to a plurality of calls by establishing a logical link on a physical line in multiplexed fashion. Moving-picture data or audio data from a terminal corresponding to each call is broken down into fixed-length information units (referred to as "cells"), and the cells are transmitted over a line sequentially to realized multiplexing.

As shown in FIG. 11, a cell is composed of fixed-length block of 53 bytes of which five bytes constitute a header HD and 48 bytes constitute an information field DT. The header HD contains a call-identifying virtual channel identifier (VCI) so that the destination will be known even after the data has been separated into blocks, a virtual path identifier (VPI) which specifies the path, a generic flow control (GFC) used in flow control between links, payload type PT and a header error control (HEC) for correcting errors.

FIG. 12 is a diagram showing the general configuration of an ATM network useful in describing ATM transmission. Shown in FIG. 12 are ATM terminals 1a, 1b and an ATM network 3. The ATM network 3 has an information network 3a that transmits data cells and a signal network 3b that transmits control signals. Call processing processors (CPUs) 3d-1~3d-n of ATM exchanges 3c-1~3c-n in the information network 3a are connected to the signal network 3b.

When a call operation is performed so that the originating terminal 1a may call the terminating terminal 1b, a cell assembler within the originating terminal 1a partitions a set-up message (data which includes the originating number, the terminating number, the type of terminal, the average cell speed and the maximum cell speed, etc.) into cell units, attaches a signal VCI (determined in advance for each terminal) to each item of partitioned data to form a signal cell and sends the signal cells to the ATM network 3.

If a signaling device of the ATM exchange (on the originating side) 3c-1 receives a signal cell, the signaling device assembles the information contained in the signal cell and notifies the CPU 3d-1 of the information. The CPU executes such call processing as processing for analyzing calling-party service, billing processing and processing for interpreting digits on the side of the terminating party, decides a virtual path (VPI) and call identifying information (VCI) on the basis of the reported average cell speed and maximum cell speed and, in accordance with a No. 7 protocol, sends the next relay exchange 3c-2 connection information, such as the originating number, terminating number, VPI, VCI and other data, via the signal network 3b. The relay exchange 3c-2 executes processing similar to that of the originating terminal 3c-1. Thereafter, processing similar to that described is performed until finally a path from the originating exchange 3c-1 to the ATM exchange (the exchange on the terminating side) 3c-n, to which the terminating terminal is connected, is decided as well as the relay ATM exchanges 3c-2, 3c-3 . . . . If the terminating exchange 3c-n receives connection information containing the originating number, the terminating number and the VCI of the higher-order ATM exchange 3c-3, then the exchange 3c-n assigns a prescribed VCI to the terminating terminal 1b and it is determined whether the terminating terminal 1b is capable of communicating. If communication is possible, then the signal network 3b notifies the originating exchange 3c-1 of the fact that communication is possible and the originating exchange assigns a prescribed VCI to the originating terminal 1a.

Each of the ATM exchanges 3c-1~3c-n on the paths registers the following, for each path, in an internal routing table in a form correlated with the VCI of the higher-order ATM exchange: (1) information (referred to as routing information or tag information) for specifying the outgoing highway of the cell having the particular VCI, and (2) a new VCI and new VPI, which are added on to the outputted cell.

Thus, when a path is formed between the originating terminal 1a and the terminating terminal 1b, the two terminals send and receive call cells and answer cells and verify the communication procedure in mutual fashion. Thereafter, the originating terminal 1a breaks down data to be transmitted into prescribed byte lengths, adds on a header containing the allocated VCI to produce a cell and sends the cell to the ATM network 3. When each of the ATM exchanges 3c-1~3c-n is supplied with an input cell from the higher-order exchange via the prescribed incoming highway, the ATM exchange refers to its own routing table to replace the VPI/VCI of the inputted cell and sends the cell out on the prescribed outgoing highway based upon the tag information. As a result, the cell outputted by the originating terminal 1a arrives at the terminating exchange 3c-n via the path that has been decided by call control. The terminating terminal 3c-n refers to its routing table, changes the VCI attached to the inputted cell to the VCI allocated to the terminating terminal and then sends the cell to the line to which the terminating terminal 11b is connected.

Thereafter, the originating terminal 1a sends cells to the terminating terminal 1b in successive fashion and the terminating terminal 1b assembles the information field DT contained in the received cells, thereby restoring the original data.

The foregoing relates to a case for dealing with one call. However, by changing the mutually held VCI values at both ends of each line between the terminal and ATM exchange and between the mutually adjacent ATM exchanges, logical links conforming to a number of calls can be established on one line. As a result, high-speed multiplexed communication may be realized. In accordance with an ATM system, information from information sources such as moving pictures, data and audio having different transmission rates can be multiplexed. As a consequence, a single transmission line can be used in a very effective manner. Moreover, retransmission control and complicated communication procedures such as implemented by software through packet switching are no longer necessary and it is possible to achieve ultra-high-speed data transmission on the order of 150 to 600 Mbps.

Further, an ATM exchange has a buffering function. In a case where a large number of calls are generated in an ATM exchange or terminating terminal, the buffering function makes it possible to accept the calls and send them to the terminating terminal without making the originating terminal wait. For example, when calls directed to the terminating terminal 1b are generated from a large number of terminals simultaneously and, as a result, the line between the exchange 3c-n on the terminating side and the terminating terminal 1b is no longer vacant, cells not sent to the terminating terminal are generated. In such case, the exchange 3c-n on the terminating side buffers the cells not sent and transmits the cells when the line becomes available, thereby making it possible to accept the calls and send them to the terminating terminal without making the transmitting terminal wait.

FIG. 13 is a diagram showing the construction of a self-routing ATM exchange useful in describing the buffering function of such ATM exchange. The self-routing ATM exchange has one basic switching unit SWU, a control-information add-on unit CIAU and a call processing CPU (call controller) CPR. It should be noted that this ATM exchange has a multistage buffer-type ATM channel configuration in which a plurality of paths exist between one given incoming highway (input port) and one given outgoing highway (output port) and a three-stage self-routing switch module is provided between each incoming highway and outgoing highway.

The basic switching unit SWU has input-stage self-routing switch modules $SRM_{11} \sim SRM_{13}$, intermediate-stage self-routing switch modules $SRM_{21} \sim SRM_{23}$ and output-stage self-routing switch modules $SRM_{31} \sim SRM_{33}$. Thus, the unit has a multiple-link (three-link in FIG. 13) construction. Primary links are indicated at $L_{11}18\ L_{33}$, and secondary links are shown at $M_{11}18\ M_{33}$. The input terminals of the input-stage self-routing switch modules $SRM_{11} \sim SRM_{13}$ are connected to incoming highways #1~#9 via the control-information add-on unit CIAU, the output terminals of the input-stage self-routing switch modules $SRM_{11} \sim SRM_{13}$ are connected to the intermediate-stage self-routing switch modules $SRM_{21} \sim SRM_{23}$, the output terminals of the intermediate-stage self-routing switch modules $SRM_{21} \sim SRM_{23}$ are connected to the output-stage self-routing switch modules $SRM_{31} \sim SRM_{33}$, and the output terminals of the output-stage self-routing switch modules $SRM_{31} \sim SRM_{33}$ are connected to outgoing highways #1~#9.

The control-information add-on unit CIAU has add-on circuits AC1~AC9, which correspond to the incoming highways #1~#9, for adding on routing information and the like. The add-on circuits AC1~AC9 add routing headers RH (see FIG. 14) onto the cells which have entered from the corresponding incoming highways, replace the VCI contained in each cell and send the cells out to the basic switching unit SWU.

The call controller CPR performs call control at the time of an outgoing call in order to decide the VCI of the call, decide the routing header in conformity with the location of the terminating terminal and write this information (the routing header and the VCI) in a routing table (not shown) of the add-on circuit to which the cell conforming to the call was applied. Furthermore, the control information (routing header and VCI) decided is written in the routing table in correlation with the VCI of the higher-order ATM exchange. The routing header RH (FIG. 14) has three items of routing information $RH_1$, $RH_2$ and $RH_3$. The routing information $RH_1$ indicates the number of the primary link, namely the output terminal number of the input-stage module; the routing information $RH_2$ indicates the number of the secondary link, namely the output terminal number of the intermediate-stage module; and the routing information $RH_3$ indicates the number of the outgoing highway, namely the output terminal number of the output stage.

When call control ends and cell enter the prescribed incoming highways via the higher-order ATM exchange, the add-on circuits AC1~AC9 connected to the incoming highways go to the routing tables to read out the control information (routing headers RH and VCI) conforming to the VCIs that have been added on to the input cells. Routing headers are then added on to the cells, the VCIs of the cells are replaced by the VCIs read out and the cells are sent out to the basic switching unit SWU. FIG. 14 shows an example of the format of the information outputted by each of the add-on circuits AC1~AC9.

The module $SRM_{ij}$ of each stage uses the routing header RHi to route the cells to the pertinent links, namely to the prescribed output terminals, whence the cells are finally transmitted from the prescribed outgoing highways. It should be noted that the routing headers are removed by a post-processing circuit (not shown) before they are transmitted to the outgoing highways.

FIG. 15 is a circuit diagram showing a specific example of a self-routing switch module (SRM1).

The module includes control-information detecting circuits $I_1 \sim I_3$, transmission-information delay circuits $D_1 \sim D_3$, demultiplexers $DM_1 \sim DM_3$ and control-information decoder circuits $DEC_1 \sim DEC_3$. These components construct a cell distributor CELD. The module further includes buffer memories, e.g., FIFOs (first-in first-out) $FM_{11} \sim FM_{33}$, selectors $SEL_1 \sim SEL_3$ and arrival-order management FIFOs $AOM_1 \sim AOM_3$. The arrival-order management FIFOs $AOM_1 \sim AOM_3$ are connected to the output terminal of each of the control-information decoder circuits DEC1~DEC3, store the orders of arrival of the cells at the corresponding three buffer memories $FM_{11} \sim FM_{13}$, $FM_{21} \sim FM_{23}$ and $FM_{31} \sim FM_{33}$ and controls the corresponding selectors SEL1~SEL3 to read the cells out of the three buffers in the order in which the cells arrived and transmit the cells to outgoing highways #1~#3.

The transmission information which enters the input terminals #1~#3 has the format shown in FIG. 14. The detecting circuit $I_i$ (i=1~3) extracts the control information contained in this signal and sends the control information to the decoder circuit $DEC_i$ (i=1~3). The control information has the routing header $RH_1$ for the input stage, the routing header $RH_2$ for the intermediate stage and the routing header $RH_3$ for the output stage. Depending upon the stage number of the self-routing switch module SRM, the detecting circuit $I_i$ detects the pertinent routing information $RH_1 \sim RH_3$ and applies the information to the decoder circuit $DEC_i$ as an input.

If the entered routing header $RH_i$ indicates output terminal #j (j=1~3), the decoder circuit $DEC_i$ operates the demultiplexer $DM_i$ by a changeover signal $S_i$ to send the transmission information to the FIFO memory $FM_{ji}$. For example, if the routing header RH contained in the information which has entered from the input terminal #1 indicates output terminal #2, the decoder circuit $DEC_1$ operates the demultiplexer $DM_1$ to apply the information from the input terminal #1 to the FIFO memory $FM_{21}$. The arrival-order management FIFO ($AOM_j$) is connected to the output terminal of each of the control-information decoder circuits $DEC_1 \sim DEC_3$ and stores the order in which the cells arrive at the corresponding three buffer memories $FM_{i1} \sim FM_{i3}$. For example, if the cells arrive in the order of buffer memory $FM_{11} \rightarrow FM_{12} \rightarrow FM_{13} \rightarrow FM_{12} \rightarrow \ldots$, buffer-memory identification numbers are stored in the arrival-order management FIFO (AOM$_1$) in the cell-arrival order 1→2→3→2→. . . . Thereafter, the arrival-order management FIFO (AOM$_i$) controls the selector SEL$_i$ to read the cells out of the three buffer memories FM$_{i1}$~FM$_{i3}$ in the order in which they arrived and transmit the cells to outgoing highway #i.

By thus providing each FIFO memory FM$_{ij}$ with a capacity for plural cells, a buffering function is obtained so that it is possible to cope adequately with cases in which there is a temporary increase in the transmission data. Further, since cells are read out of the buffer memories FM$_{i1}$~FM$_{i3}$ in the order in which they arrived, equal numbers of cells are pooled by the buffer memories FM$_{i1}$~FM$_{i3}$ and a situation in which the buffer memories overflow and cells are discarded is eliminated.

FIG. 16 is a simplified representation of a self-routing switch module. The buffer memories FM$_{11}$~FM$_{mm}$ are arranged at the intersections of m-number of input links and m-number of output links. The self-routing switch module of FIG. 15 corresponds to the portion enclosed by the dashed line in FIG. 16.

Thus, as set forth above, an ATM exchange (ATM switching system) is a system which performs switching in VCI/VPI units within a cell header. In order to enlarge the scope of such a N×N ATM exchange having the numbers N of incoming highways and the numbers N of outgoing highways, a method (first method) of increasing the numbers N has been considered. According to this method, however, when N is increased, the amount of necessary hardware (modules) increases in proportion to $N^2$; hence, the larger N is made, the greater the amount of hardware required.

Further, a method (second method) of connecting n×n modules in multiple stages has been considered as a method of enlarging the scope of the system. FIG. 17 illustrates a case in which mn×mn ATM switches are arranged in parallel by providing three stages of n×n ATM switches SW$_{i1}$~SW$_{i3}$ (i=1~m) in m rows. The outgoing highways of each ATM switch in each stage are divided into m sets of n/m highways each and enter each of m-number of ATM switches constituting the next stage. In accordance with the composition of multiple stages, the amount of hardware is m·(3n$^2$). For example, in case that 8n×8n ATM switch in which m equals 8 is composed by the second method, an amount of hardware conforming to 24n$^2$ is required. With the first method, on the other hand, an amount of hardware conforming to 64n$^2$ is required. Thus, the second method is advantageous in that the amount of hardware required is reduced in comparison with the first method.

According to the second method, however, the outgoing highways of the ATM switches of each stage must be divided up into m sets of n/m highways each and wiring must be provided in such a manner that these highways enter each of the m-number of ATM switches of the next stage. Consequently, when m is changed in order to enlarge the scale of the ATM switches, the wiring must also be changed. This means that extending the system is very troublesome.

Another problem is that signals from an STM (synchronous transfer mode) network cannot be introduced to an ATM network or vice versa to enable simple communication between the respective terminals.

SUMMARY OF THE INVENTION

A first object of the present invention is to provide a self-routing exchange in which the amount of hardware can be reduced.

A second object of the present invention is to provide a self-routing exchange in which rewiring is not required when the exchange is extended, thereby affording an exchange which can be easily extended.

A third object of the present invention is to provide an exchange system in which an ATM network and an STM network can be joined to enable switching processing between them.

According to the present invention, the first and second objects are attained by providing a self-routing exchange having an arrangement in which switch modules are connected in multiple stages, wherein a circuit switching module such as STM switch module, which is capable of changing over a connection relationship between incoming highways and outgoing highways, is provided as an intermediate one of the switch modules and self-routing switch modules such as ATM switch modules are provided as switch modules in stages preceding and succeeding the circuit switching module, and further having a controller for setting the connection relationship between incoming highways and outgoing highways of the circuit switching module.

According to the present invention, the third object is attained by providing a switching system comprising: a multi-staged arrangement of switch modules connected in multiple stages, wherein a circuit switching module such as STM switch module, which is capable of changing over a connection relationship between incoming highways and outgoing highways, is provided as an intermediate one of the switch modules and self-routing switch modules such as ATM switch modules are provided as switch modules in stages preceding and succeeding the circuit switching module; a controller for controlling changeover of the connection relationship between incoming highways and outgoing highways of the circuit switching module; a cell constructing module for forming a signal that has entered from a STM network into cells, converting the cells to a frame and inputting the frame into the circuit switching module, and a cell deconstructing module for converting a frame having a prescribed format, which has entered from the self-routing switch module via the circuit switching module, into a cell stream, subsequently deconstructing the cells and inputting the results to a STM network.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS (A) Overview of the invention

Figure 1:
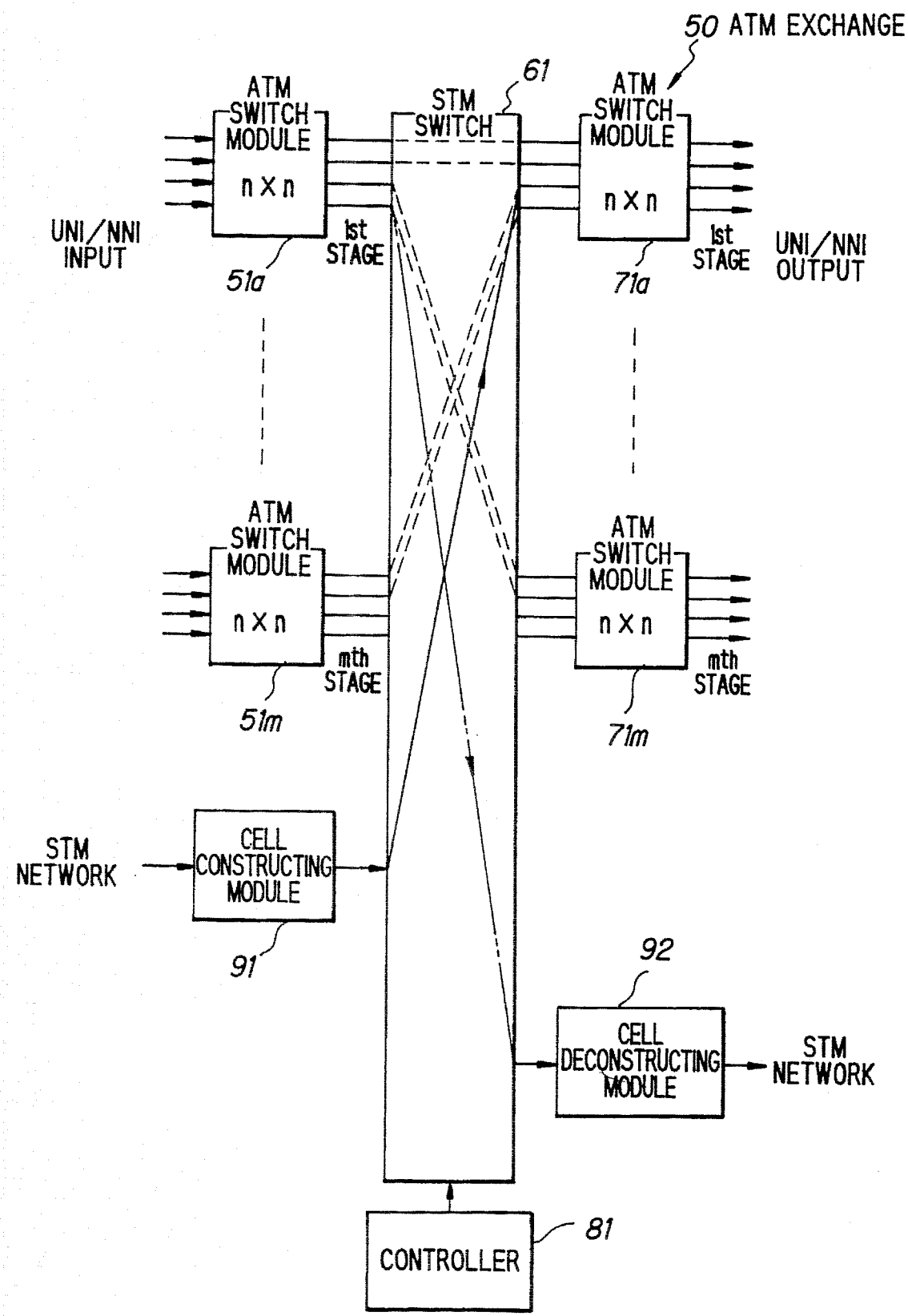
FIG. 1 is a diagram showing an overview of the present invention.

FIG. 1 is a diagram illustrating an overview of the present invention. The self-routing exchange of the invention has a construction in which switch modules are connected in multiple stages. This multistage connection includes an STM switch module (circuit switching module) 61, which serves as an intermediate switching module, capable of changing over the connection relationship between incoming and outgoing highways in semi-permanent fashion; ATM switch modules (self-routing switch modules) 51a~51m serving as switch modules in the stage preceding the STM switch module 61; ATM switch modules (self-routing switch modules) 71a~71m serving as switch modules in the stage succeeding the STM switch module 61; and a controller 81 for setting the connection relationship between the incoming and outgoing highways of the ATM switch module 61 in semi-permanent fashion by means of software. Further, numerals 91, 92 denote cell constructing and deconstructing modules.

More specifically, in dependence upon the number m of ATM switch modules in the preceding and succeeding stages, the controller 81 sets, by means of software, the connection relationship between the incoming and outgoing highways in each of space switches incorporated within the STM switch module 61. The total mn-number of incoming highways which enter from the ATM switch modules 51a~51m are connected to respective ones of mn-number of outgoing highways set by the controller 81, whereby these highways become the incoming highways of prescribed ATM switch modules 71a~71n. In a case where the ATM switch modules of the preceding and succeeding stages are increased in number, the controller 81, in conformity with the new number m' of ATM switch modules, changes the connection relationship between the incoming and outgoing highways in each space switch built in the STM switch module 61. The change is made using software. Since the connection relationship between the incoming and outgoing highways need only be changed semi-permanently by the controller 81 in dependence upon the number of ATM switch modules through use of software, rewiring is unnecessary even if the ATM switch modules are increased in number.

This makes it easy to extend the system. Further, since the switch modules are connected in multiple stages to construct the self-routing exchange and the intermediate switch module is constituted by an STM switch module, the required number of modules can be kept small even when the numbers of incoming and outgoing highways are increased to enlarge the scale of the system. This makes it possible make the system compact in size.

The cell constructing module 91 forms a signal that has entered from an STM network into cells, converts the cells to a frame (cell frame), and inputs the cell frame to the ATM switch modules 71a~71m on the output side via the intermediate STM switch module (circuit switching module) 61. The cells are then transmitted to the ATM network. The cell deconstructing module 92 forms a cell frame, which has entered from prescribed ATM switch modules 51a~51m via the STM switch module 61, into a cell stream, subsequently deconstructs the cells and inputs the results to an STM network. By adopting this arrangement, signals can be introduced from an STM network to an ATM network or vice versa, thereby enabling communication between the terminals in respective networks in a simple manner.

(B) First embodiment of the invention (a) Overall configuration

An ATM exchange unifies services of a variety of types to allow switching. Multiplexing bursty information and treating the burst property approximately randomly raises the efficiency with which the resource (transmission band) of the exchange is utilized. Accordingly, it is preferred that the switching unit of the exchange be operated at high speed. Though various switching methods are conceivable, cell buffering is necessary in terms of high-speed operation. The depth of the buffer is a parameter which decides cell loss rate with regard to bursty information. The deeper the buffer, the more efficient the utilization of the exchange resource with regard to the bursty information. However, this inevitably leads to a larger system size. This tendency becomes more conspicuous the larger the scale of the switching unit.

Since an STM (synchronous transfer mode) switch is not aware of the form of information undergoing switching, the size of the switching unit is not dependent upon the information switched. Accordingly, in a multistage-connected ATM exchange, the switch module of the intermediate stage is made a high-speed STM switch module. If this arrangement is adopted, the overall size of the ATM exchange can be made small. Moreover, the burst property can be dealt with randomly to raise the utilization efficiency of the ATM exchange resource.

Figure 2:
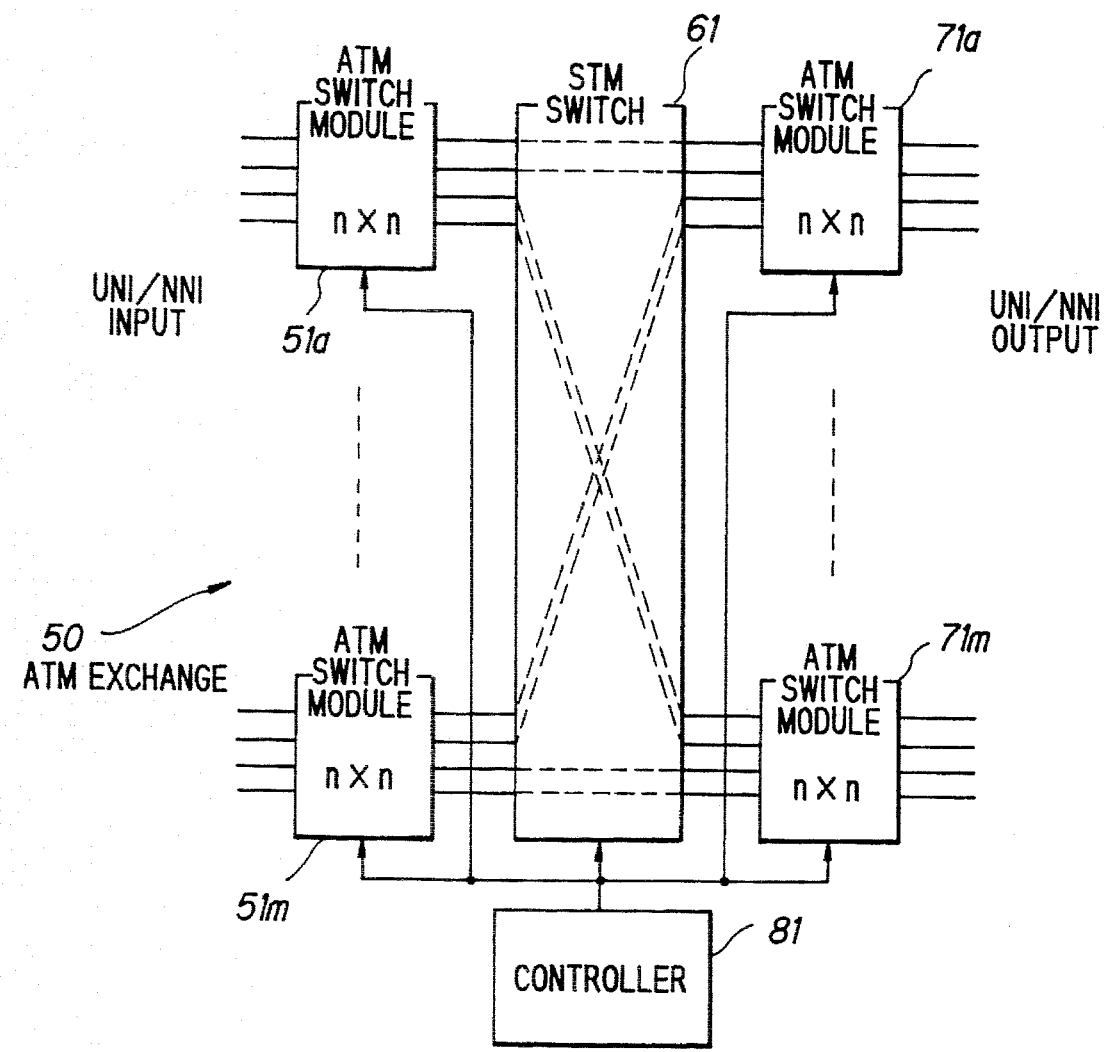
FIG. 2 is a block diagram illustrating the overall construction of a first embodiment of the present invention.

FIG. 2 is a block diagram illustrating the overall construction of the ATM exchange according to the present invention, which takes the foregoing points into consideration.

Numeral 50 in FIG. 2 denotes an ATM exchange (a self-routing exchange) having a construction in which switch modules are connected in multiple stages (three stages in this illustration). Numerals 51a~51m denote the m-number of ATM switch modules (self-routing switch modules) of the first stage (up-going) for switching cells entering from a UNI/NNI (user network interface/network node interface). Each ATM switch module has n-number of inputs and n-number of outputs, where n is assumed to be 16 calculated at 622 Mbps. Numeral 61 denotes the STM switch module (circuit switching module) of the second (intermediate) stage. This module incorporates a number of space switches and is capable of freely setting the connection relationship between incoming and outgoing highways by means of software. Once the connection relationship has been set, the setting is semi-permanent as long as the number ATM switch modules is not changed. The STM switch module 61, which is capable of connecting 16 ATM switch modules, is for performing switching on the basis of a SONET STS-12. The SONET (synchronous optical network) is constructed to minimize the amount of buffering so that data can be transmitted at high speed. This feature is exploited in the STM switch module 61 to control information by pointer action. As a result, it is possible to realize a switch that is small in terms of size but extensive in scale. Numerals 71a~71m denote the m-number of ATM switch modules of the third stage (down-going), each module having n-number of inputs and n-number of outputs. These modules switch input cells and send them to the prescribed UNI/NNI. Numeral 81 denotes the controller for setting the connection relationship between the incoming and outgoing highways by controlling the space switches within the ATM switch module 61 by means of software.

(b) ATM switch module

Figure 3:
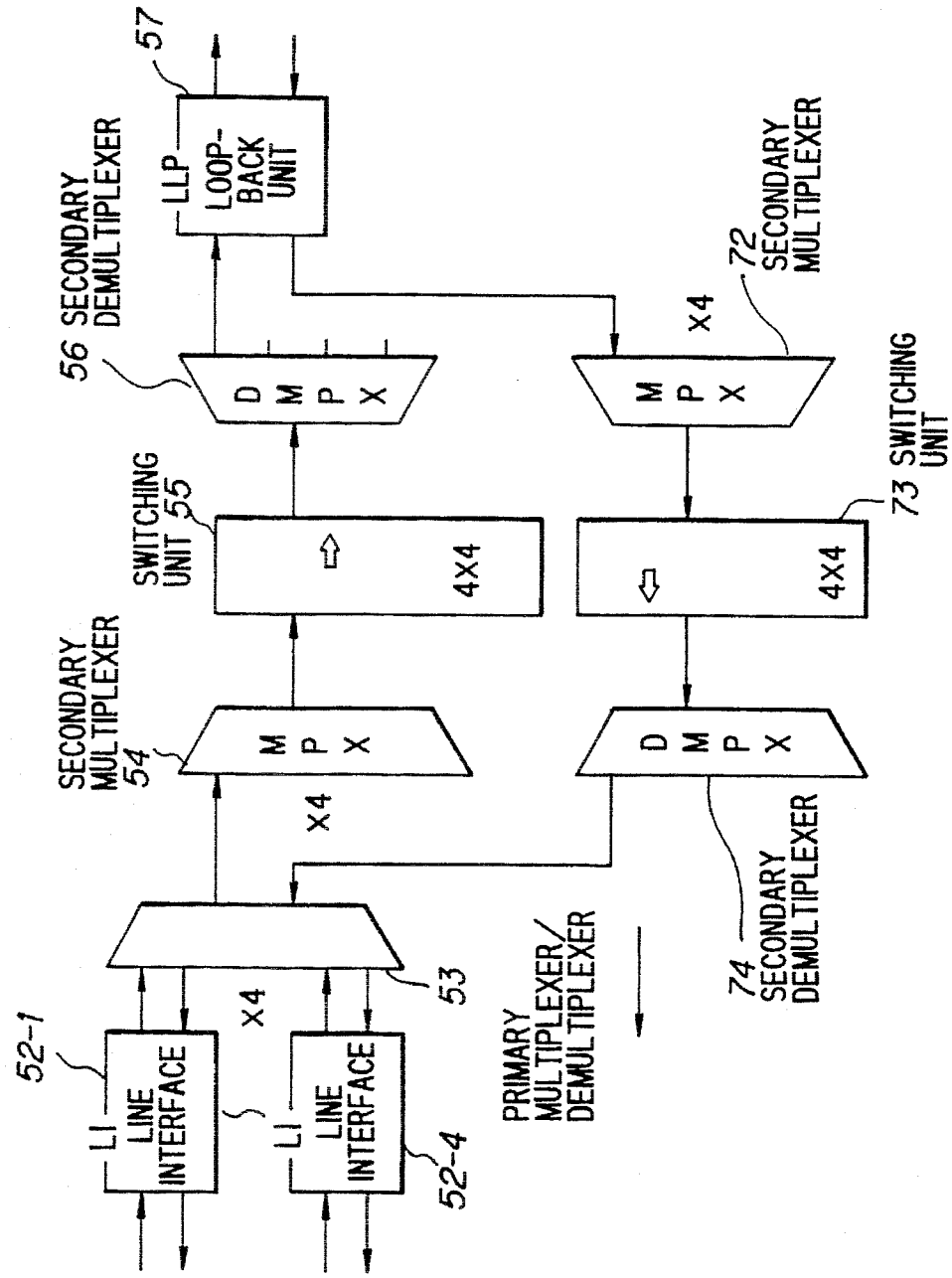
FIG. 3 is a block diagram of an ATM switch module.

FIG. 3 is a diagram showing the construction of the up-going and down-going ATM switch modules.

Numerals 52-1~52-4 denote line interfaces (LI). (1) With respect to the up-going direction, these interfaces separate a frame signal conforming to the UNI/NNI into ATM cells and output the cells. (2) With respect to the down-going direction, the interfaces convert ATM cells into frame signals conforming to the UNI/NNI and transmit the frame signals. As for the UNI/NNI, a SONET STS-12C (622 Mbps), SONET STS-3C (156 Mbps), SONET STS-1 (5.1 Mbps), DS3 (45 Mbps) and a DS1 (1.5 Mbps), etc., are stipulated. By way of example, a UNI/NNI of the SONET STS-3C (156 Mbps) is connected to the line interfaces LI.

A primary multiplexer/demultiplexer (MPX/DMPX) 53 multiplexes ATM cells of STS-3C (156 Mbps), which have entered from the four line interfaces LI, and outputs the cells in the form of an STS-12C (622 Mbps) ATM cell stream with regard to the up-going direction. As for the down-going direction, the (MPX/DMPX) 53 divides the STS-12C (622 Mbps) ATM cell stream into four branches of STS-3C (156 Mbps) and inputs the cells to the line interfaces LI. A secondary multiplexer (MPX) 54 multiplexes ATM cells of STS-12C (622 Mbps), which have entered from four primary multiplexer/demultiplexers (MPX/DMPXs) 53, and outputs the cells in the form of an ATM cell stream of STS-48C (2.4 Gbps).

A four-input, four-output up-going ATM switch 55 switches the ATM cells to prescribed outgoing highways on the basis of routing information that has been added on to each ATM cell in the ATM cell stream of STS-48C (2.4 Gbps). A secondary demultiplexer (DMPX) 56 divides the ATM cell stream of STS-48C (2.4 Gbps) into four branches of STS-3C (156 Mbps) to form an ATM cell stream of STS-12C (622 Mbps). A loop-back unit (LLP) 57 establishes a setting to either transmit the ATM cell stream to the side of the STM switch module, which is the next stage, or loop back the cell stream to a down-going ATM switch module 73 without the intervention of the STM switch module. In the case of a small-scale ATM exchange in which the STM switch module 61 (FIG. 2) is not provided, the loop-back unit 57 loops back the cell stream so that the stream enters the down-going ATM switch module 73. In the case of a large-scale ATM exchange in which the STM switch module 61 is provided, the loop-back unit 57 transmits the cell stream to the STM switch module constituting the next stage.

A secondary multiplexer 72 multiplexes the four ATM cell streams of STS-12C (622 Mbps), which have entered from the STM switch module 61 via the loop-back unit, and outputs the cells as an ATM cell stream of STS-48C (2.4 Gbps). The four-input, four-output down-going ATM switch 73 switches the ATM cells to prescribed outgoing highways on the basis of routing information that has been added on to each ATM cell in the ATM cell stream of STS-48C (2.4 Gbps). A secondary demultiplexer (DMPX) 74 divides the ATM cell stream of STS-48C (2.4 Gbps) into four branches to form an ATM cell stream of STS-12C (622 Mbps).

Each of the ATM switch modules 51a~51m of the first stage (up-going direction) of the ATM exchange 50 (FIG. 2) is constituted by ① an up-going circuit portion of the line interfaces (LI) 52-1~52-4, ② a multiplexer portion of the primary multiplexer/demultiplexer 53, ③ the secondary multiplexer 54, ④ the up-going switching unit 55, ⑤ the secondary demultiplexer 56 and ⑥ the up-going circuit portion of the loop-back unit 57. Each of ATM switch modules 71a~71m of the third stage (down-going direction) of the ATM exchange is constituted by ① the down-going portion of the loop-back unit 57, ② the secondary demultiplexer 72, ③ the down-going switching unit 73, ④ the secondary demultiplexer 74, ⑤ the demultiplexer portion of the primary multiplexer/demultiplexer 53 and ⑥ the down-going circuit portion of the line interfaces 52-1~52-4.

(c) Line interface (LI)

Figure 4:
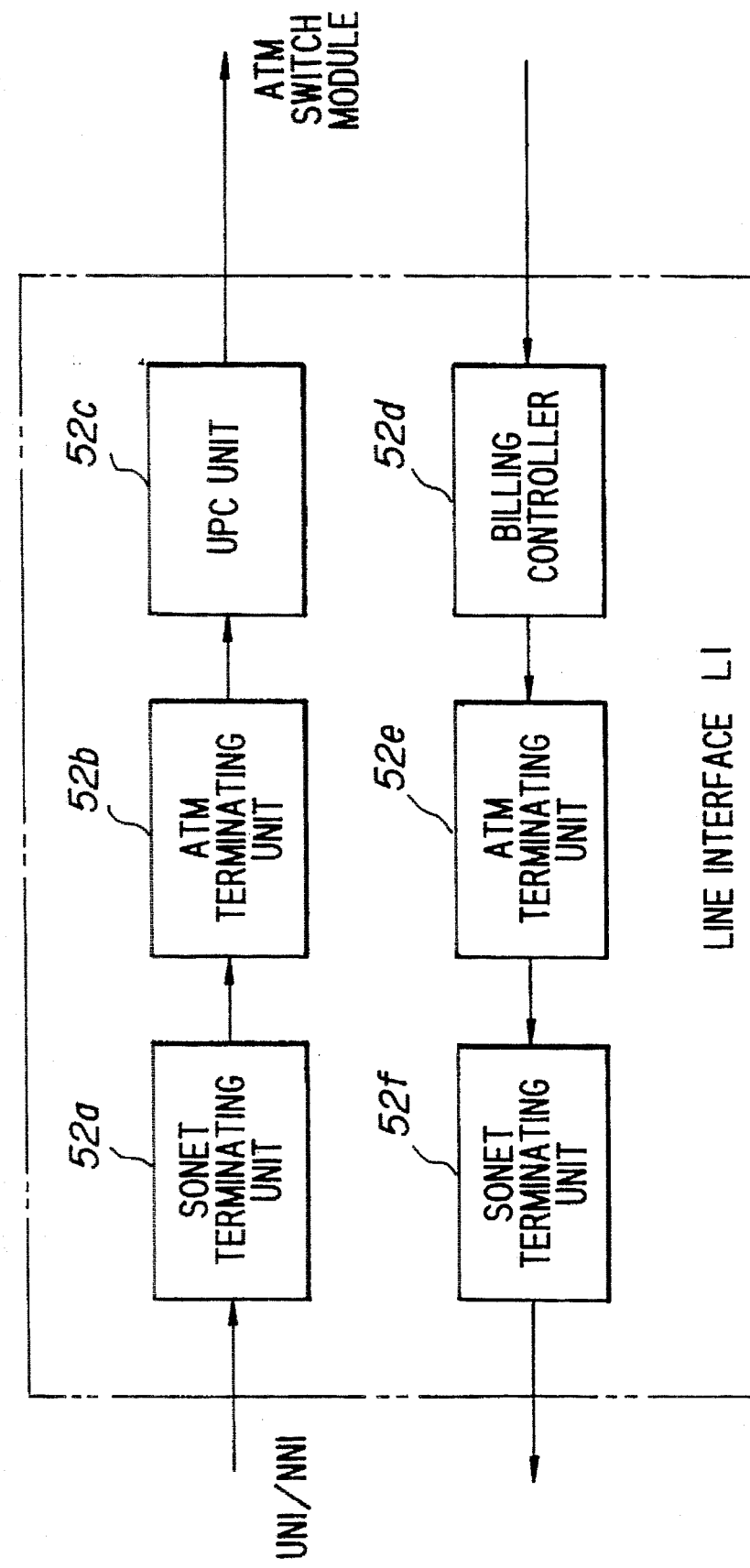
FIG. 4 is a block diagram of a line interface LI.

FIG. 4 is a diagram showing the construction of the line interface LI. The line interface LI has components for the up-going direction and components for the down-going direction. In the up-going direction, the components are a SONET (synchronous optical network) terminating unit 52a, an ATM terminating unit 52b and a UPC (usage parameter control) unit 52c. The components in the down-going direction are a billing controller 52d, an ATM terminating unit (ATM forming unit) 52e and a SONET terminating unit (SONET forming unit) 52f.

Figure 5:
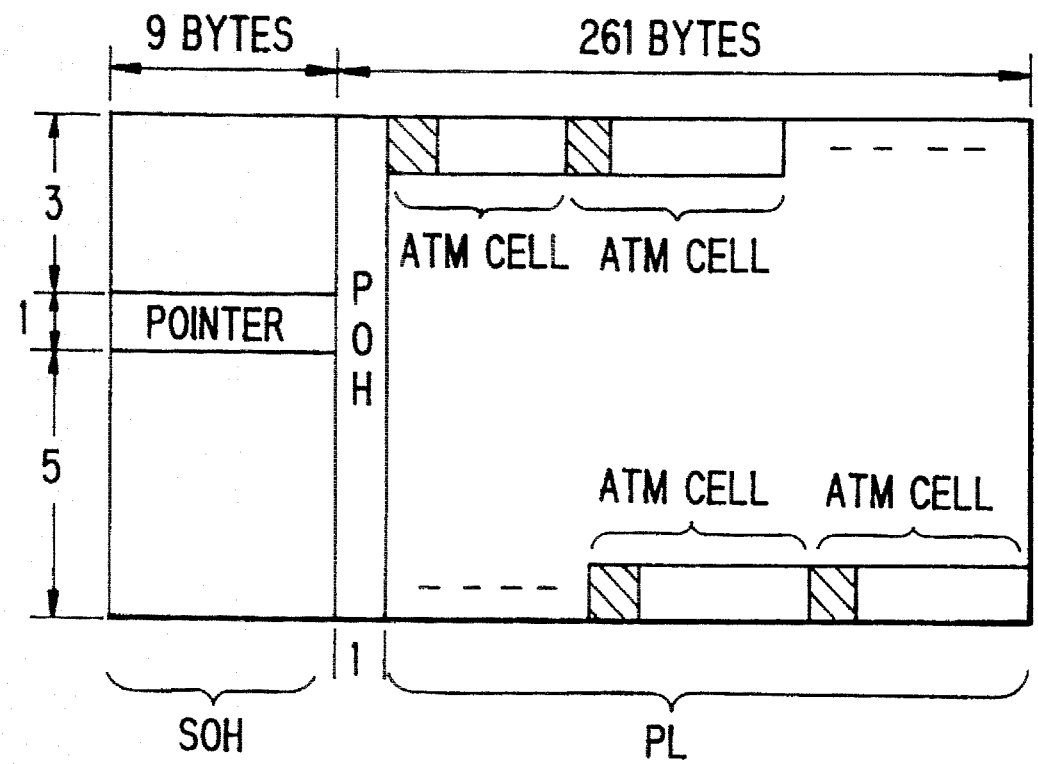
FIG. 5 is a diagram showing the frame format of a SONET STS-3.

The SONET terminating unit 52a eliminates overhead (section overhead, path overhead) from a frame signal conforming to the UNI/NNI, such as a frame signal having a SONET STS-3C (156 Mbps) format. FIG. 5 is a diagram for describing the frame format of SONET STS-3C (156 Mbps). One frame is composed of 9×270 bytes. The first 9×9 bytes constitute section overhead SOH, and the remaining bytes constitute path overhead POH and payload PL. The section overhead SOH is a portion which transmits ① information (frame synchronizing signal) representing the beginning of the frame, ② information specific to the transmission path (information which checks for errors at the time of transmission, information for maintaining the network, etc.), and ③ a pointer indicating the position of the path overhead POH. The path overhead POH is a portion which transmits information for end-to-end monitoring within the network, and the payload PL is a portion which transmits 150 Mbps information as an ATM cell.

Figure 6:
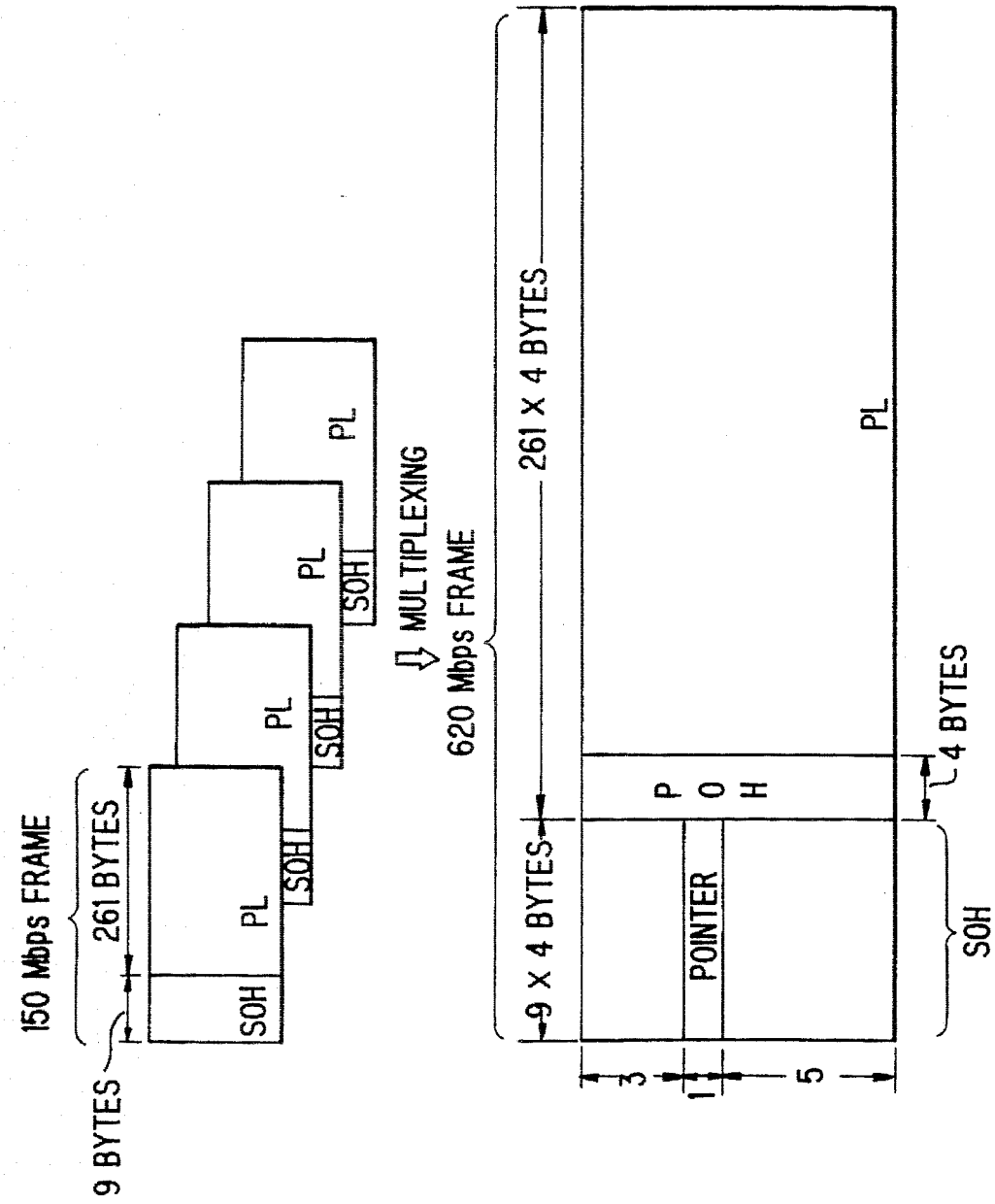
FIG. 6 is a diagram showing the frame format of a SONET STS-12.

FIG. 6 is a diagram for describing a SONET STS-12C (622 Mbps) frame format generated by multiplexing SONET STS-3C (156 Mbps) frames. Here the frame is constituted by section overhead SOH of 9×9×4 bytes, path overhead POH of 9×4 bytes (only nine bytes are actually used, with the remainder being unused), and payload PL (VC-4 container) of 9×260×4 bytes.

The ATM terminating unit 52b identifies the beginning of an ATM cell by using an HEC (header error control) contained in the header of the ATM cell, replaces the VCI/VPI, eliminates the HEC and adds on routing information instead. The UPC unit 52c performs monitoring to determine whether the reported value of transmission capacity and the actual amount of cell inflow agree. When the amount of in-flowing cells exceeds the reported value, the UPC unit 52c discards the cells that are in violation of stipulations.

The billing controller 52d creates billing data by counting the number of ATM cells that have passed through it. The ATM terminating unit (ATM forming unit) 52e removes the routing information from an entered ATM cell, computes an HEC and inserts the HEC instead. The SONET terminating unit (SONET forming unit) 52f converts the entered STS-12 cell stream into a frame of the SONET STS-3C format shown in FIG. 5 and transmits the frame to the UNI/NNI.

(d) STM switch module

Since the UNI/NNI of the ATM stipulates the maximum-speed STM-12, the STM switch module 61 is based upon the STM-12.

Figure 7:
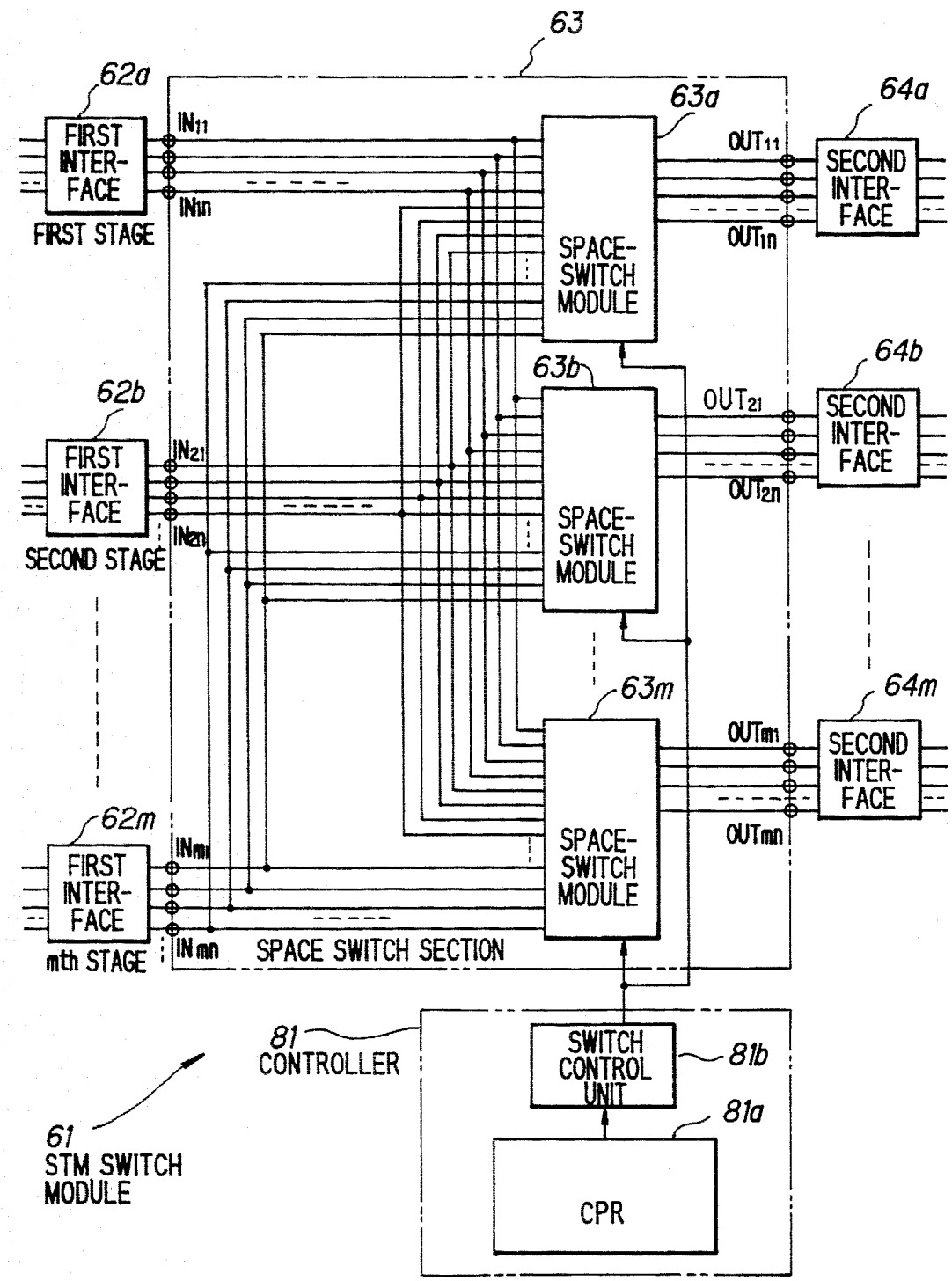
FIG. 7 is a block diagram of an STM switch module.

FIG. 7 is a diagram illustrating the construction of the STM switch module 61, which includes first interfaces 62a~62m, a space-switch section 63 and second interfaces 64a~64m. Numeral 81 denotes the controller. The space-switch section 63 has input terminals $IN_{11}$~$IN_{mn}$ and output terminals $OUT_{11}$~$OUT_{mn}$.

The controller 81 includes a call processor 81a for performing call-processing control and for controlling the connection relationship between the incoming and outgoing highways of the space-switch section 63, and a switch controller 81b for changing over the connections between the incoming and outgoing highways of the space-switch section 63 in accordance with a command from the call processor 81a.

The first interfaces 62a~62m are provided to correspond to respective ones of the ATM switch modules 51a~51m (see FIG. 2) in the up-going direction. The first interfaces 62a~62m create a frame having the SONET STS-12C format by adding overhead onto the STS-12C inputted from the ATM switch modules 51a~51m, and output the frame to the space-switch section 63. The second interfaces 64a~64m, which are provided to correspond to respective ones of the ATM switch modules 71a~71m (see FIG. 2) in the down-going direction, remove overhead from the SONET STS-12C frame outputted by the space-switch section 63, thereby effecting a conversion to an STS-12C cell stream.

The space-switch section 63 is equipped with space-switch modules 63a~63m the number of which corresponds to the number m of ATM switch modules in the up-going or down-going direction. For example, if the number of n×n ATM switch modules provided in each of the up-going and down-going directions is m, then the space-switch section 63 will have m-number of the space-switch modules 63a~63m. Further, all n-number of outgoing highways from each of the ATM switch modules 51a~51m (for a total of nm outgoing highways) are connected to each of the space-switch modules 63a~63m. In actuality, the number M of space-switch modules is greater than the actual number m of ATM switch modules in consideration of the fact that additional ATM switch modules may be added on later. Wiring is performed in advance in such a manner that input terminals $IN_{11}$~$IN_{Mn}$ of the space-switch section 63 to which the n-number of outgoing highways of each ATM switch module are connected can be connected to all M-number of the space-switch modules 63a~63m.

The space-switch modules 63a~63m are adapted to connect prescribed incoming highways (input terminals) to prescribed outgoing highways (output terminals) in accordance with a command from the controller 81. For example, the n-number of outgoing highways of each of the ATM switch modules 51a~51m (the n-number of outgoing highways of the first interfaces 62a~62m) are divided up into m sets of n/m highways each. The first space-switch module 63a connects (n/m)-number of first-set incoming highways (the total number is n) from each of the ATM switch modules 51a~51m to the incoming highways of the down-going ATM switch module 71a via the second interface 64a. Similarly, the second space-switch module 63b connects (n/m)-number of second-set incoming highways (the total number is n) from each of the ATM switch modules 51a~51m to the incoming highways of the down-going ATM switch module 71b via the second interface 64b. In like fashion the m-th space-switch module 63m connects (n/m)-number of mth-set incoming highways (the total number is n) from each of the ATM switch modules 51a~51m to the incoming highways of the down-going ATM switch module 71m via the second interface 64m.

Figure 8:
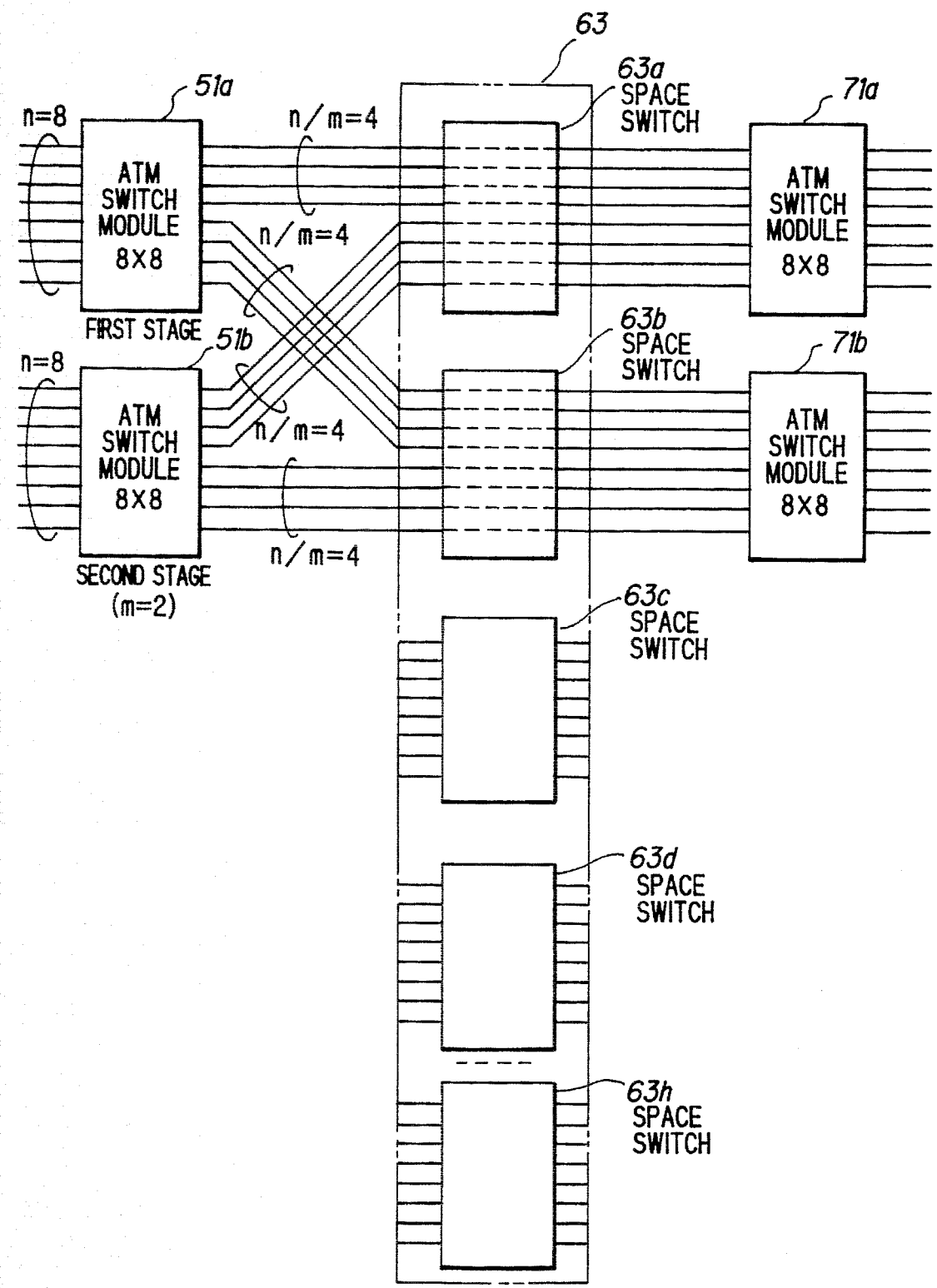
FIG. 8 is a diagram showing the switching of space switches (m=2, n=8)

FIG. 8 is a diagram for describing the switching of the space switches in a case where m=2 and n=8. Though only the actual signal routes are shown, the space-switch section 63 is wired in such a manner that m can be increased to eight (m=8).

The first space-switch module 63a is connected (see the dashed lines) in such a manner that n/m (=4) cell streams of the first set entering from the outgoing highways of each of the ATM switch modules 51a, 51b enter the ATM switch module 71a. The second space-switch module 63b is connected (see the dashed lines) in such a manner that n/m (=4) cell streams of the second set entering from each of the ATM switch modules 51a, 51b enter the ATM switch module 71b. Accordingly, ATM cells from any incoming highway of the ATM switch modules 51a, 51b can be fed into the prescribed space-switch modules 63a, 63b by suitably deciding the routing information added onto these ATM cells, and then the cells can be transmitted from any outgoing highway by being switched at the ATM switch modules 71a, 71b connected to the space-switch modules.

Figure 9:
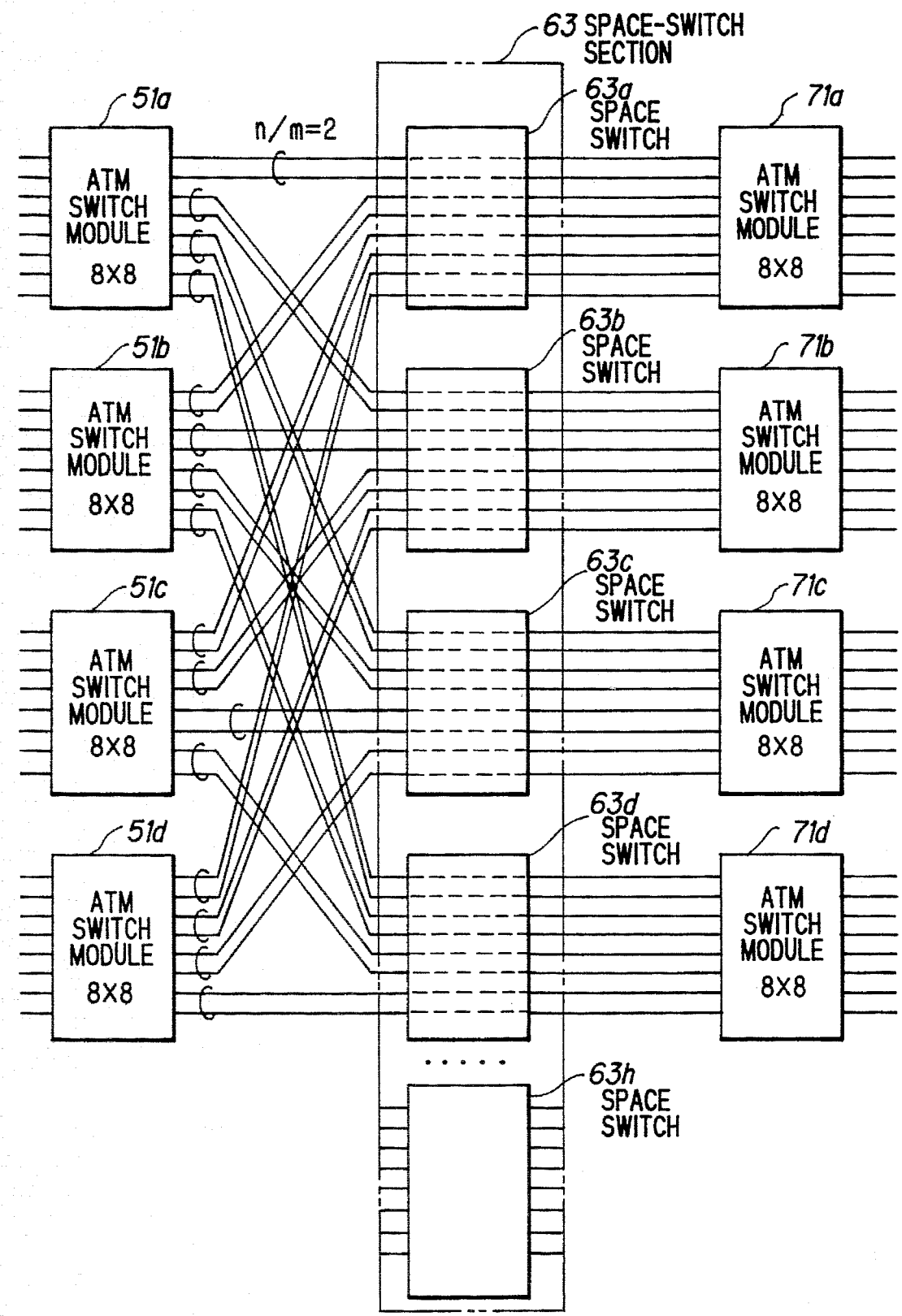
FIG. 9 is a diagram showing the switching of space switches (m=4, n=8)

FIG. 9 is a diagram showing the switching of space switches for a case in which m is increased to four (m=4); only the actual signal routes are shown. The first space-switch module 63a connects the incoming and outgoing highways (see the dashed lines) in such a manner that n/m (=2) cell streams of the first set entering from the respective ATM switch modules 51a~51d enter the ATM switch module 71a of the down-going direction. The second space-switch module 63b connects the incoming and outgoing highways (see the dashed lines) in such a manner that n/m (=2) cell streams of the second set entering from the respective ATM switch modules 51a~51d enter the ATM switch module 71b of the down-going direction. The third space-switch module 63c connects the incoming and outgoing highways (see the dashed lines) in such a manner that n/m (=2) cell streams of the third set entering from the respective ATM switch modules 51a~51d enter the ATM switch module 71c of the down-going direction. The fourth space-switch module 63d connects the incoming and outgoing highways (see the dashed lines) in such a manner that n/m (=2) cell streams of the fourth set entering from the respective ATM switch modules 51a~51d enter the ATM switch module 71d of the down-going direction.

Accordingly, ATM cells from any incoming highway of the ATM switch modules 51a~51d can be fed into the prescribed space-switch modules 63a~63d by suitably deciding the routing information added onto these ATM cells, and then the cells can be transmitted from any outgoing highway by being switched at the ATM switch modules 71a~71d connected to the space-switch modules.

(e) Operation of exchange

The STM switch module 61 is constructed in such a manner that a maximum of M-number of ATM switch modules can be connected to take into account a case in which additional ATM switch modules are provided to extend the system. More specifically, the space-switch section 63 of the STM switch module 61 is provided with M-number space-switch modules. The Mn-number of input terminals $IN_{11} \sim IN_{Mn}$ of the space-switch section 63 to which n-number of outgoing highways from each of the m-number of ATM switch modules are connected are wired to the space-switch modules 63a~63M in advance. Further, the n-number of outgoing highways from each of the M-number of space-switch modules are wired to respective output terminals $OUT_{11} \sim OUT_{Mn}$ of the space-switch section 63 in advance.

Under these conditions, the n-number of outgoing highways of the actual m-number ($\leq M$) of up-going ATM switch modules 51a~51m are connected to the input terminals $IN_{11} \sim IN_{mn}$ of the space-switch section 63 via the first interfaces 62a~62m. The n-number of incoming highways of the m-number ($\leq M$) of down-going ATM switch modules 71a~71m are connected to the output terminals $OUT_{11} \sim OUT_{mn}$ of the space-switch section 63 via the second interfaces 64a~64m. Connections are controlled by the controller 81 in such a manner that prescribed input terminals of the space-switch section 63 are connected to prescribed output terminals. As a result, the first space-switch module 63a connects the (n/m)-number of first-set incoming highways (the total number of which is n) from each of the ATM switch modules 51a~51m to the incoming highways of the down-going space-switch module 71a via the second interface 64a. Similarly, the second space-switch module 63b connects the (n/m)-number of second-set incoming highways (the total number of which is n) from each of the ATM switch modules to the incoming highways of the down-going space-switch module 71b via the second interface 64a. In similar fashion, the m-th space-switch module 63m connects the (n/m)-number of m-th-set incoming highways (the total number of which is n) from each of the ATM switch modules to the incoming highways of the down-going space-switch module 71m via the second interface 64m.

Thus, there is provided a multistage-connected ATM exchange in which m-number of ATM switch modules are connected in each of the up-going and down-going directions.

The cells from the UNI/NNI of the B-ISDN are accommodated by prescribed up-going ATM switch modules 51a~51m and are switched in VCI/VPI units. In the case of an intra-office call, cells are transferred, via the STM switch module 61, to the down-going ATM switch modules 71a~71m accommodated by the terminating subscriber. In case of other trunk calls, cells are transferred, via the STM switch module 61, to the down-going ATM switch modules 71a~71m accommodating the interfaces of the NNI at the destination.

In a case where ATM switch modules are additionally provided to extend the system, n-number of outgoing highways of the up-going ATM switch module added on are connected to n-number of input terminals of the space-switch section via the first interface, and n-number of incoming highways of the down-going ATM switch module added on are connected to n-number of output terminals of the space-switch section via the second interface. If the number of up-going and down-going ATM switch modules becomes m' owing to the extension of the system, then the connection relationship between the input terminals and output terminals of the space-switch section 63 is changed by the controller 81. That is, the first space-switch module 63a connects (n/m')-number of first-set incoming highways (the total of which is n) from each of the ATM switch modules 51a~51m' to the incoming highways of the down-going ATM switch module 71a via the second interface 64a. Further, the second space-switch module 63b connects (n/m')-number of second-set incoming highways (the total of which is n) from each of the ATM switch modules to the incoming highways of the down-going ATM switch module 71b via the second interface 64b. Similarly, the m'-th space-switch module 63m' connects (n/m')-number of m'th-set incoming highways (the total of which is n) from each of the ATM switch modules to the incoming highways of the down-going ATM switch module 71m' via the second interface 64m'.

Thus, there is provided a multistage-connected ATM exchange in which m'-number of ATM switch modules are connected in each of the up-going and down-going directions.

Thus, in accordance with the first embodiment, the connection relationship between the incoming and outgoing highways need only be changed semi-permanently by the controller 81 in dependence upon the number of ATM switch modules through use of software. Hence, rewiring is unnecessary even if the ATM switch modules are increased in number. This makes it easy to extend the system. Further, since the ATM exchange is connected in multiple stages and the ATM switch module of the intermediate stage is replaced by the high-speed STM switch module, the overall size of the ATM exchange can be reduced. Moreover, the burst property is treated randomly so that it is possible to raise the utilization efficiency of the ATM exchange resource.

(C) Second embodiment of the invention

In the first embodiment, the STM switch module 61 is used in the connection between the up-going and down-going ATM switch modules. As a result, an STM switching system (e.g., an ordinary telephone exchange) can be provided as stages preceding and succeeding the STM switch module in place of the ATM switch module or as newly added equipment, the data of the STM network can be multiplexed in the form of SONET frames and these can be inputted to and outputted from the STM switch module 61. If this arrangement is adopted, a system in which the ATM network and STM network are joined can be constructed with ease.

Figure 10:
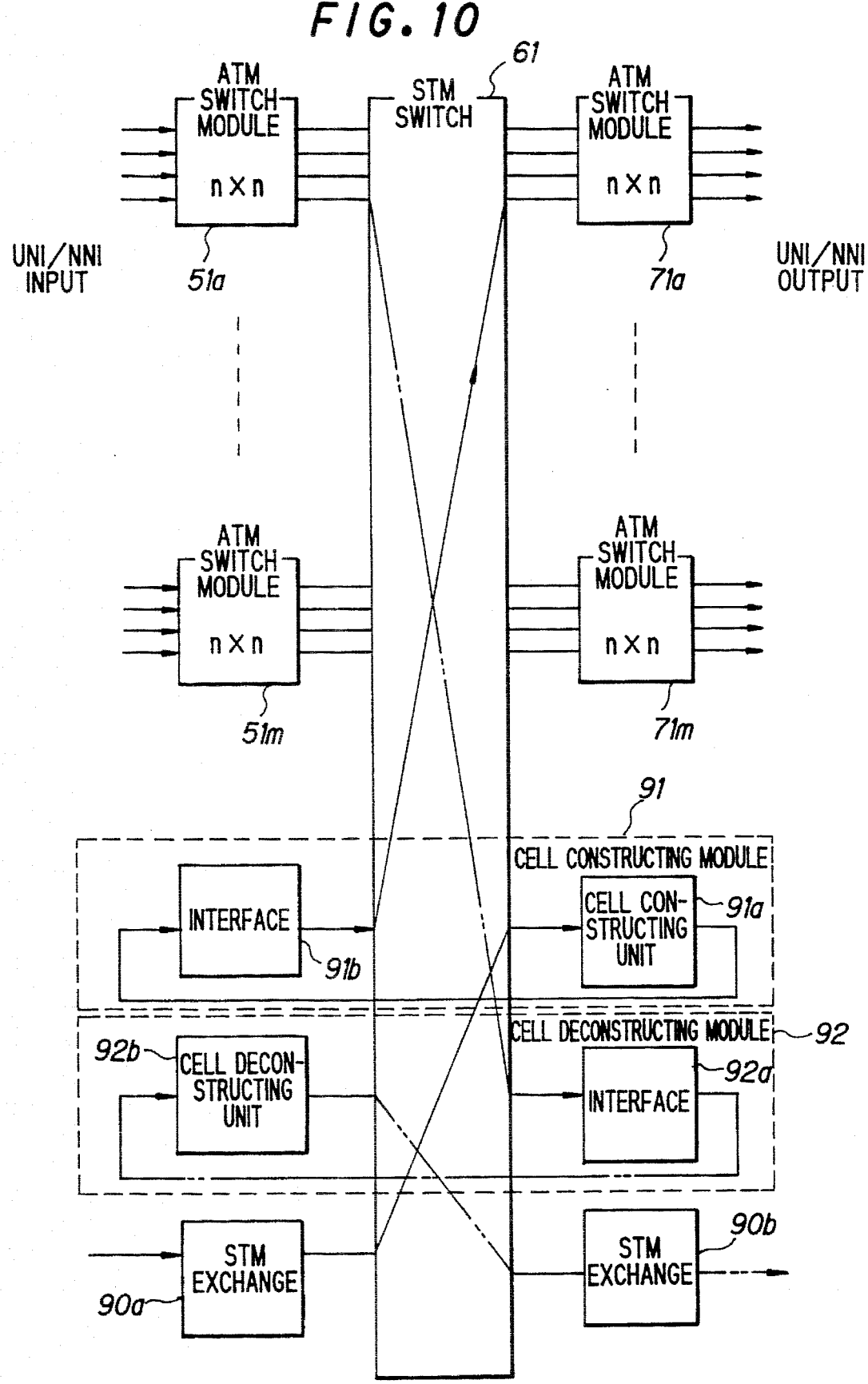
FIG. 10 is a block diagram illustrating the overall construction of a second embodiment of the present invention.
Figure 11:
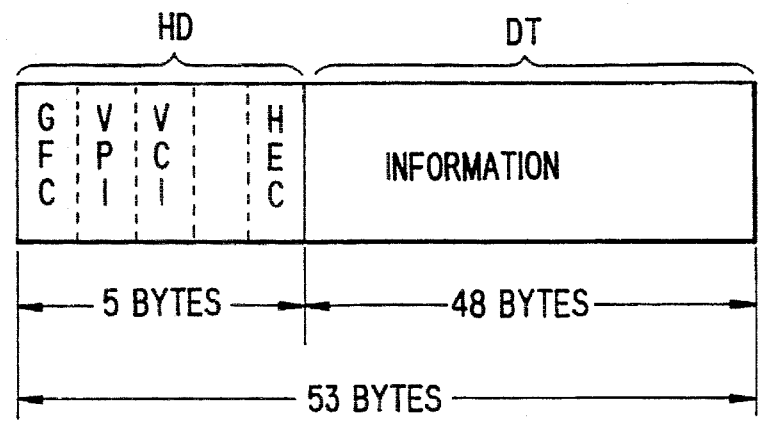
FIG. 11 is a block diagram showing the constitution of an ATM cell according to the prior art.
Figure 12:
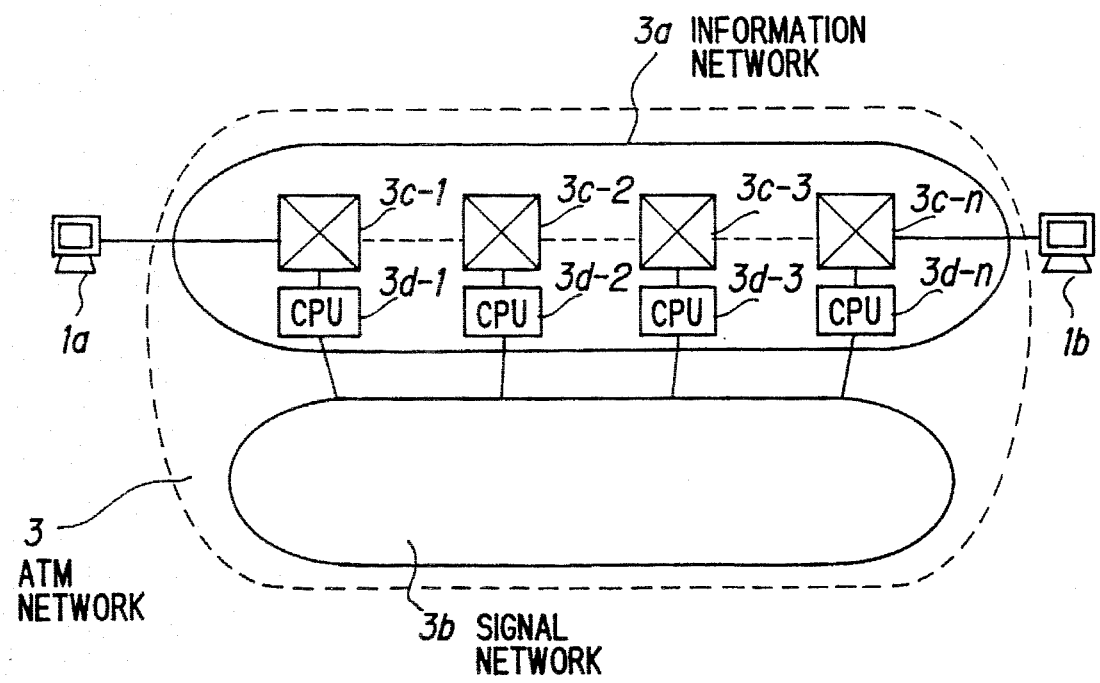
FIG. 12 is a diagram showing the general features of an ATM network according to the prior art.
Figure 13:
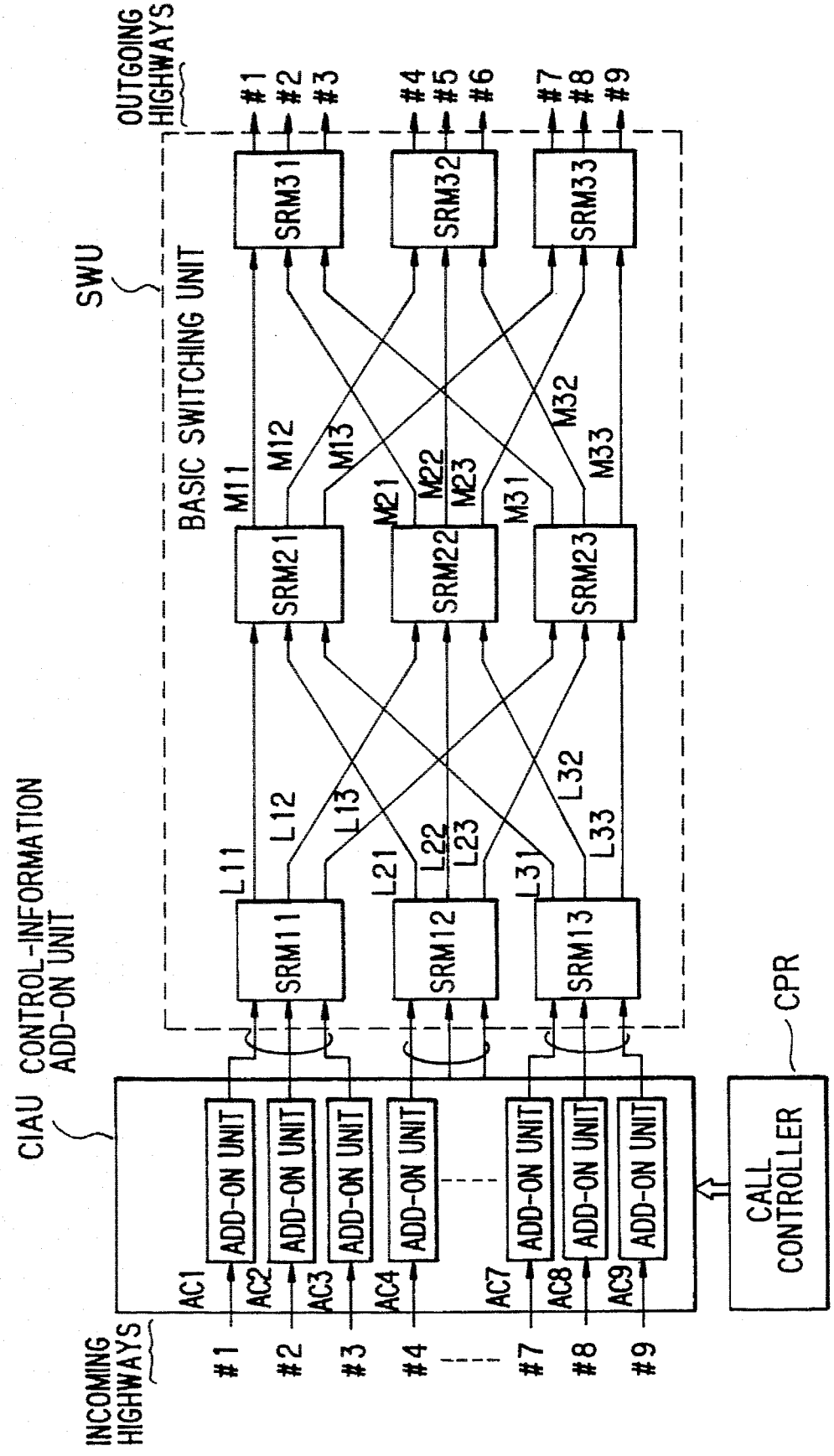
FIG. 13 is a diagram showing the construction of a multiple-route, multistage buffer-type ATM exchange according to the prior art.
Figure 14:
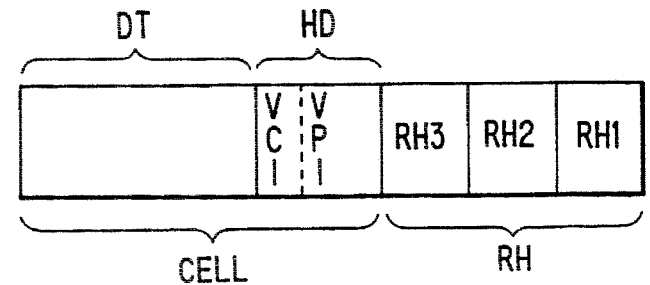
FIG. 14 is a diagram showing a routing header added on to an ATM cell according to the prior art.
Figure 15:
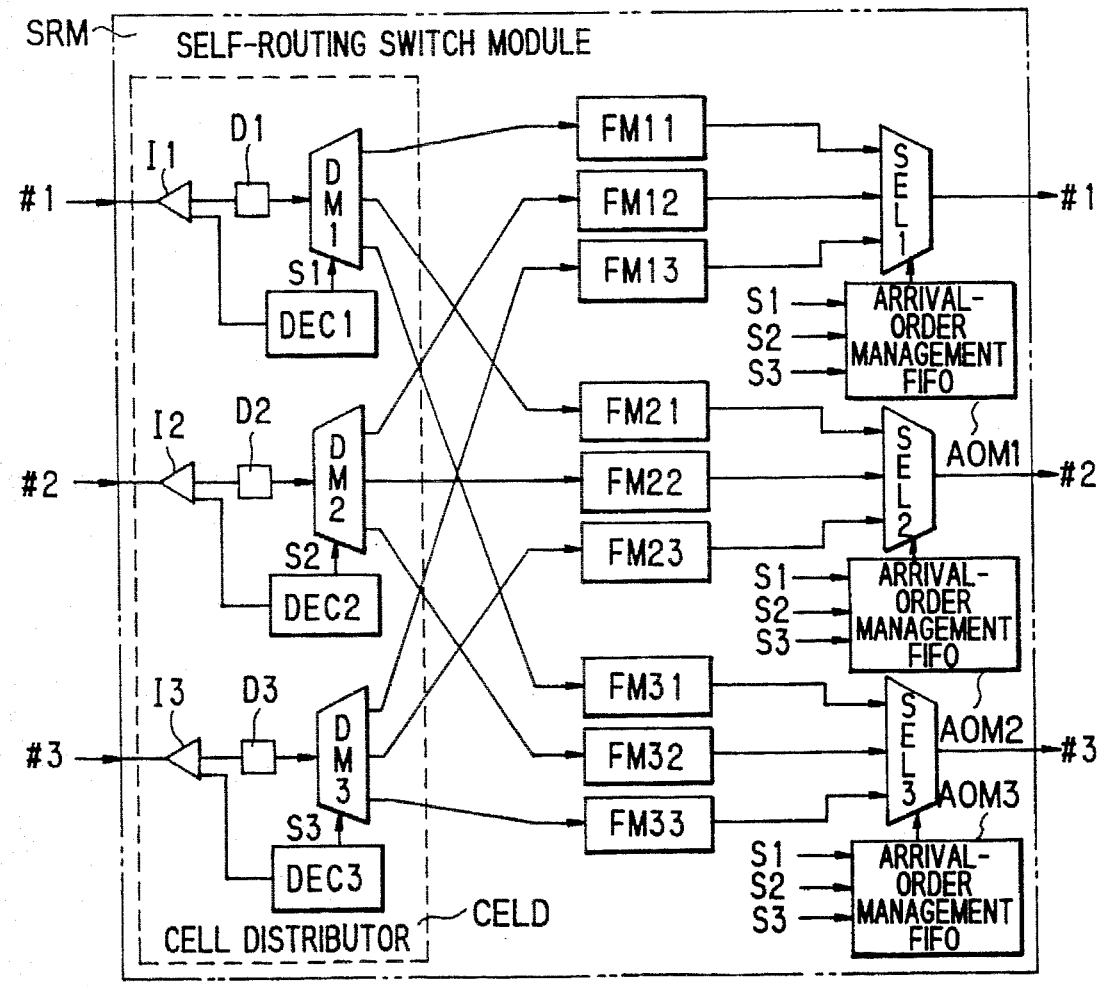
FIG. 15 is a diagram showing the construction of a self-routing switch module according to the prior art.
Figure 16:
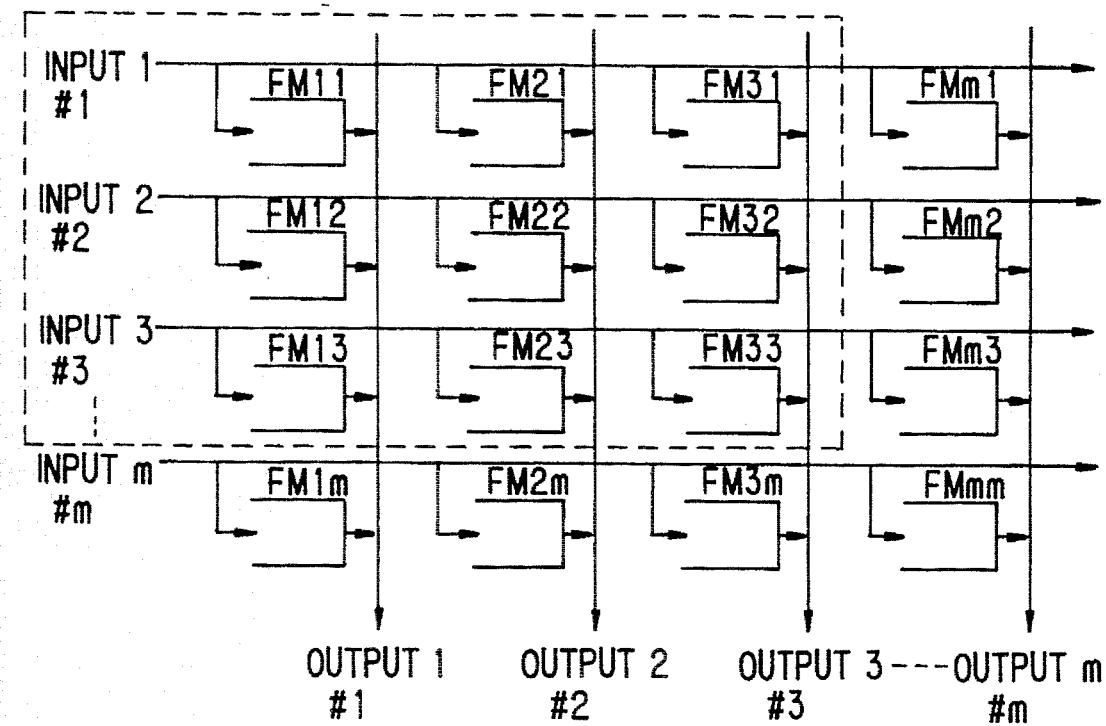
FIG. 16 is a diagram showing the general representation of a self-routing switch module according to the prior art.
Figure 17:
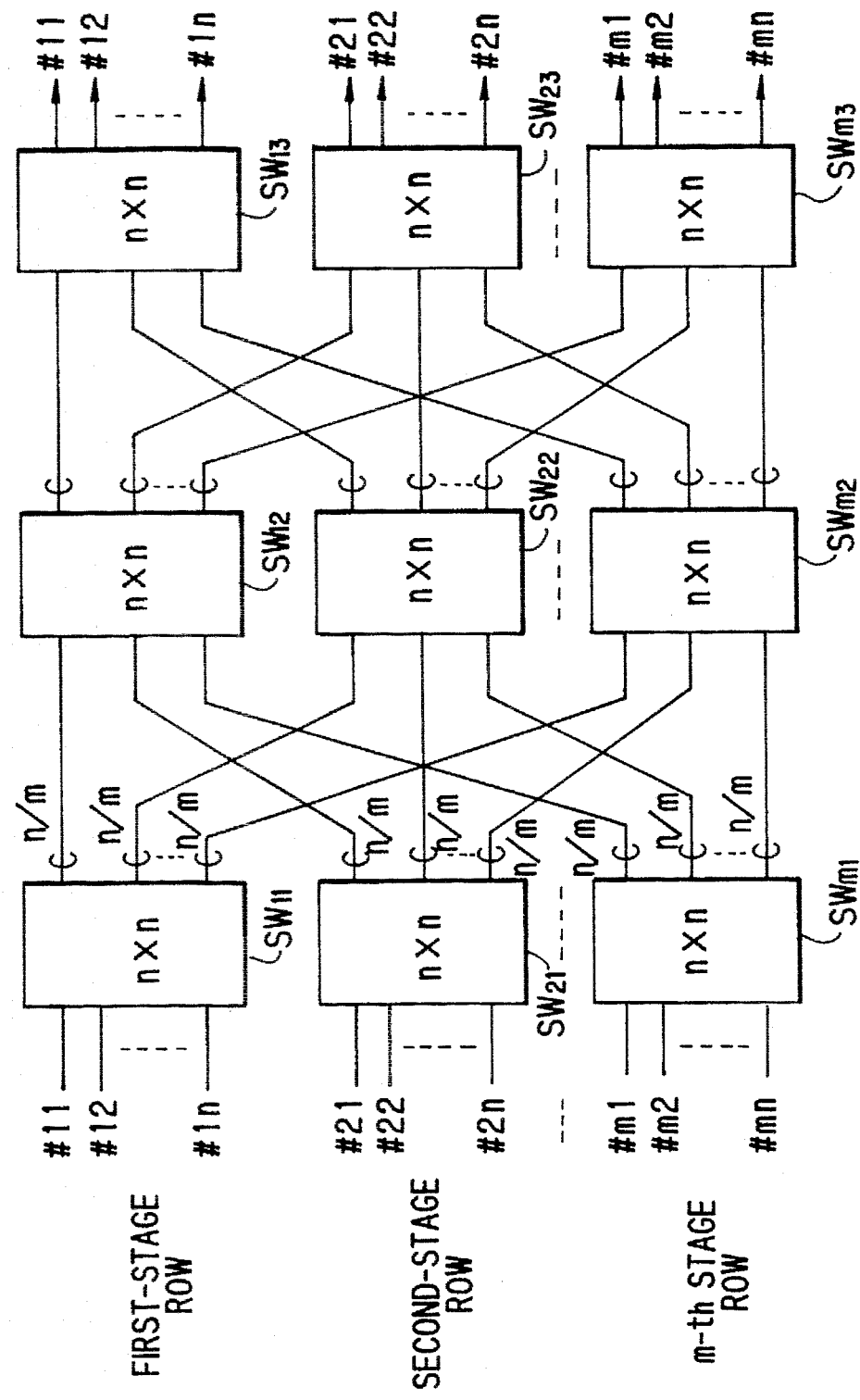
FIG. 17 is a block diagram showing an ATM exchange connected in multiple stages according to the prior art.

FIG. 10 is a block diagram illustrating the overall construction of a second embodiment of the present invention, in which components identical with those of the first embodiment in FIG. 2 are designated by like reference characters. Numerals 51a~51m denote the m-number of ATM switch modules of the first stage (up-going direction), and numeral 61 denotes the STM switch module (circuit switching module) of the second (intermediate) stage, which incorporates a number of space switches. Numerals 71a~71m denote the m-number of ATM switch modules of the third stage (down-going direction). Numerals 90a, 90b designate STM exchanges, 91 the cell constructing module and 92 the cell deconstructing module. The cell constructing module 91 has a cell constructing unit 91a for forming a signal entering from the STM network into cells, and an interface 91b (forming unit) for converting a cell stream into a frame having the SONET STC-12 format. The cell deconstructing unit 92 has an interface (de-forming unit) 92a for converting a SONET STC-12 frame into a cell stream, and a cell deconstructing unit 92b for deconstructing the cell stream and transmitting the results.

The cell constructing module 91 forms a signal, which has entered from the STM network (STM exchange 90a) via the STM switch module 61, into cells and converts the cells to a frame having the SONET STC-12 format. Next, the cell constructing module 91 inputs the frame to the intermediate STM switch module 61 again. The STM switch module 61 inputs the entered frame to prescribed ATM switch modules 71a~71m on the output side, and the frame is transmitted to the ATM network via these ATM switch modules 71a~71m. The cell deconstructing module 92 forms the frame of the SONET STC-12 format, which has entered from prescribed ATM switch modules 51a~51m via the STM switch module 61, into a cell stream, subsequently deconstructs the cells and forms signal for the STM network, thereafter inputs the results to the STM network.

If this arrangement is adopted, signals can be introduced from an STM network to an ATM network or vice versa, thereby enabling communication between the respective terminals in a simple manner. That is, the scope of the ATM exchange can be enlarged and it is possible to construct a switching system in which an ATM network and an STM network can be joined.

Thus, in accordance with the present invention, since the connection relationship between the incoming and outgoing highways need only be changed semi-permanently by the controller in dependence upon the number of ATM switch modules through use of software, rewiring is unnecessary even if the ATM switch modules are increased in number. This makes it easy to extend the system.

Further, in accordance with the present invention, the switch modules are connected in multiple stages to construct the ATM exchange and the intermediate switch module is replaced by a high-speed STM switch module. Consequently, the overall size of the ATM exchange can be reduced. Moreover, the bursts are dealt with randomly so that the resource of the ATM exchange can be utilized more efficiently.

Further, in accordance with the present invention, a cell constructing module and a cell deconstructing module are connected to the STM switch module of the intermediate stage. As a result, a signal from the STM network can be formed into cells and the cells can be sent to an ATM network. Further, a cell stream from the ATM network entering via STM switch module can be subjected to cell deconstruction and the results sent to the STM network. In other words, signals can be introduced from an STM network to an ATM network or vice versa, thereby enabling communication between the respective terminals in a simple manner. It is possible to construct a switching system in which an ATM network and an STM network are joined.

As many apparently widely different embodiments of the present invention can be made without departing from the spirit and scope thereof, it is to be understood that the invention is not limited to the specific embodiments thereof except as defined in the appended claims.

What is claimed is:

1. A self-routing exchange for switching fixed-length cells, which have control data for self-routing and transmission information, to prescribed outgoing paths, comprising:

switch modules connected in multiple stages which include an intermediate stage, a stage preceding and a stage succeeding said intermediate stage, wherein said intermediate stage is a circuit switching module capable of changing over a connection relationship between incoming highways and outgoing highways, and each of said stages preceding and succeeding said intermediate stage includes self-routing switch modules; and a controller for setting the connection relationship between incoming highways and outgoing highways of said circuit switching module.

2. The exchange according to claim 1, further comprising:

a first interface, which is provided between a self-routing module of said preceding stage and said circuit switching module, for converting a cell stream into a frame having a predetermined format; and a second interface, which is provided between said circuit switching module and a self-routing module of said succeeding stage, for converting a frame having a predetermined format into a cell stream.

3. The exchange according to claim 1, wherein said circuit switching module comprises space switches.

4. The exchange according to claim 3, wherein said circuit switching module has M space switches, where M is equal to or greater than m and m represents the number of self-routing switch modules, each having n inputs and n outputs, provided in each of said preceding and succeeding stages;

all n outgoing highways from each of said m self-routing switch modules in said preceding stage are connected to each of the M space switches; and in accordance with a command from said controller, each of m space switches connects n/m incoming highways, from each of said m self-routing switching modules, for a total of n incoming highways, to prescribed outgoing highways, and n outgoing highways of each of said m space switches are connected to a self-routing switch module in said succeeding stage.

5. The exchange according to claim 2, wherein each self-routing switch module in said preceding stage includes:

a plurality of line interfaces each of which is connected to a user network interface (UNI) or network node interface (NNI), wherein a plurality of line interfaces are divided into n groups;

n multiplexers each of which is connected to a group of line interfaces for multiplexing cells outputted by said group of line interfaces;

an n×n self-routing switch connected to said n multiplexers; and n demultiplexers each of which is connected to n outgoing highways of said self-routing switch, for demultiplexing a multiplexed cell stream inputted from a respective outgoing highway;

wherein the cell stream demultipexed by each demultiplexer is inputted to said first interface.

6. The exchange according to claim 5, wherein each self-routing switch module in said succeeding stage includes:

n multiplexers each of which is connected to a plurality of output terminals of said second interface, for multiplexing cell streams outputted by said second interface;

an n×n self-routing switch connected to said n multiplexers;

n demultiplexers each of which is connected to n outgoing highways of said self-routing switch, for demultiplexing a multiplexed cell stream inputted from a respective outgoing highway; and a plurality of line interfaces for converting the cell stream, which has been demultiplexed by each demultiplexer, into a frame of a prescribed format and outputting the frame.

7. A self-routing exchange for joining a self-routing network and a Synchronous Transfer Mode (STM) network so that switching may be performed between the two networks, the self-routing exchange comprising:

switch modules connected in multiple stages which include an intermediate stage, a stage preceding and a stage succeeding said intermediate stage, wherein said intermediate stage is a circuit switching module, and each of said stages preceding and succeeding said intermediate stage includes self-routing switch modules;

a controller for controlling changeover of the connection relationship between incoming highways and outgoing highways of said circuit switching module;

a cell constructing module for forming a signal that has entered from the STM network into cells, converting the cells to a frame having a prescribed format and inputting the frame to said circuit switching module; and a cell deconstructing module for converting a frame having a prescribed format, which has entered from a prescribed self-routing switch module via said circuit switching module, into a cell stream, subsequently deconstructing the cells and inputting the results to the STM network.

* * * * *